(12) United States Patent
Zeng et al.

(10) Patent No.: US 9,101,986 B2
(45) Date of Patent: Aug. 11, 2015

(54) TOOL HOLDER

(75) Inventors: Xian-Cai Zeng, Shenzhen (CN);
Dong-Cheng Liu, Shenzhen (CN);
Chin-Tsan Huang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 334 days.

(21) Appl. No.: 13/592,569

(22) Filed: Aug. 23, 2012

(65) Prior Publication Data
US 2013/0099454 A1 Apr. 25, 2013

(30) Foreign Application Priority Data

Oct. 24, 2011 (CN) .......................... 2011 1 0325628

(51) Int. Cl.
*B23Q 11/04* (2006.01)
*B23B 29/14* (2006.01)
*B23B 31/38* (2006.01)
*B23B 31/08* (2006.01)

(52) U.S. Cl.
CPC ............... *B23B 29/14* (2013.01); *B23B 31/083* (2013.01); *B23B 31/38* (2013.01); *B23Q 11/04* (2013.01); *B23B 2260/128* (2013.01); *Y10T 279/20* (2015.01); *Y10T 279/21* (2015.01); *Y10T 408/14* (2015.01)

(58) Field of Classification Search
CPC .... B23B 31/083; B23B 31/086; B23B 31/38; B23B 2260/0445; B23B 2260/128; B23B 29/14; B23Q 11/04; Y10T 279/20; Y10T 279/21; Y10T 408/14
USPC ............ 279/125, 126, 156; 408/5, 6; 318/434
IPC ....................................................... B23Q 11/04
See application file for complete search history.

(56) References Cited

U.S. PATENT DOCUMENTS 2,540,332 A * 2/1951 Hrybinyk ...................... 192/150
(Continued)

FOREIGN PATENT DOCUMENTS

| CN | 2416996 Y | 1/2001 |
| CN | 2925738 Y | 7/2007 |

(Continued)

*Primary Examiner* — Eric A Gates
(74) *Attorney, Agent, or Firm* — Novak Druce Connolly Bove + Quigg LLP (57) ABSTRACT

A tool holder for holding a cutting tool comprises a housing, a sleeve received in one end of the housing, a switch fastened in the other end of the housing, a cover fastened at an end of the housing adjacent to the sleeve to prevent the sleeve from being taken out of the housing, and an elastic member sleeved on the sleeve. The switch is electrically connected to a control system of a main spindle of a CNC turning machine and is applied for controlling the movement of the main spindle. The elastic member is compressed to elastically resist with the sleeve and generates an elastic force to make the sleeve move away from the switch, and the sleeve is slidably configured along the inner surface of the housing to contact the switch to stop the movement of the main spindle of the CNC turning machine.

19 Claims, 6 Drawing Sheets

(56) References Cited

U.S. PATENT DOCUMENTS

| | | | | |
|---|---|---|---|---|
| 4,425,060 | A * | 1/1984 | Bilz et al. | 408/6 |
| 4,507,025 | A * | 3/1985 | Fedor | 408/6 |
| 5,062,743 | A * | 11/1991 | Wieland et al. | 408/6 |
| 5,155,473 | A * | 10/1992 | Oketani et al. | 340/680 |
| 5,351,039 | A * | 9/1994 | Oketani et al. | 340/680 |
| 5,911,578 | A * | 6/1999 | Gross | 433/127 |
| 7,677,844 | B2 * | 3/2010 | Schell et al. | 408/9 |

FOREIGN PATENT DOCUMENTS

| | | | | |
|---|---|---|---|---|
| GB | 2061140 A | * | 5/1981 | B23B 31/12 |
| JP | 59053108 A | * | 3/1984 | B23B 31/02 |
| JP | 62136338 A | * | 6/1987 | B23Q 11/04 |
| TW | 180411 | | 1/1992 | |
| TW | 197644 | | 1/1993 | |
| TW | 201713 | | 3/1993 | |

* cited by examiner

TOOL HOLDER

BACKGROUND

1. Technical Field

The present disclosure relates to tool holders, particularly to a tool holder for holding a cutting tool.

2. Description of Related Art

In the machining process of a computer numerical control machine, frequent changes of cutting tools received in tool holders are needed. However, in the process of changing a cutting tool, a small deviation of the distance between the cutting tool and the tool holder or the distance between the cutting tool and the fixing portion, may cause the cutting tool, the tool holder or the fixing portion to collide with one another and become damaged.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the mobile measuring platform. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
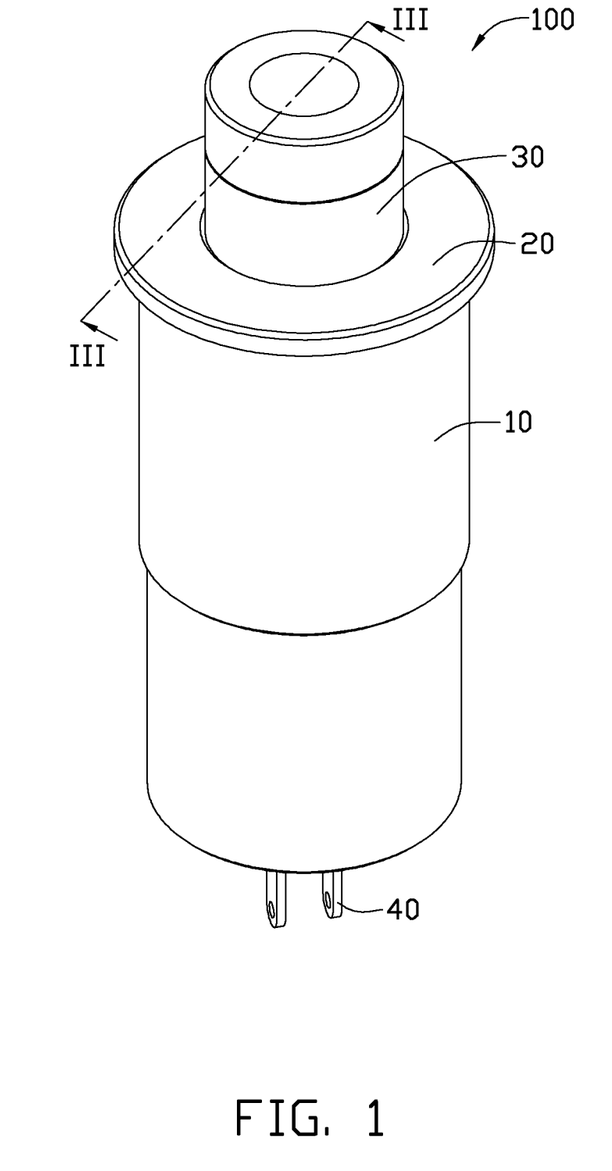
FIG. 1 is an isometric view of an embodiment of a tool holder.
Figure 2:
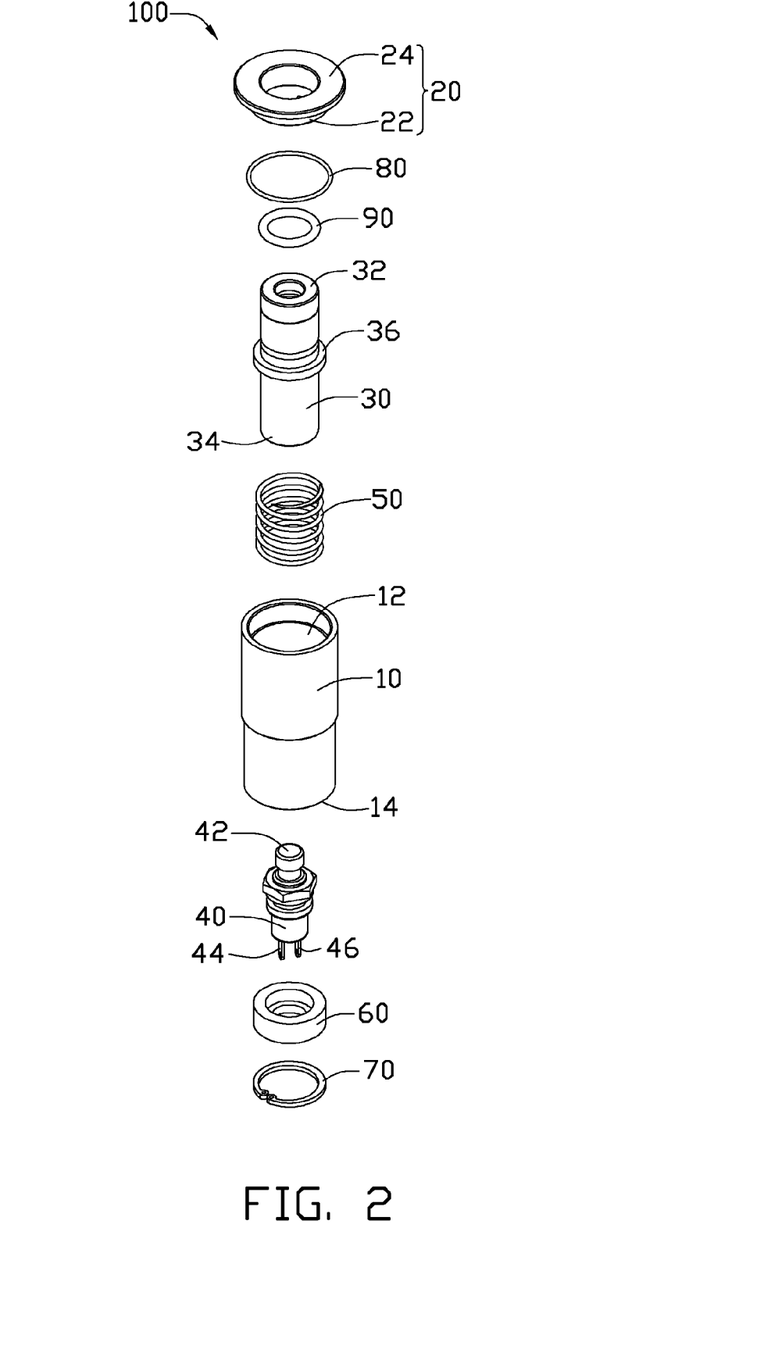
FIG. 2 is an exploded, isometric view of the tool holder of FIG. 1.
Figure 4:
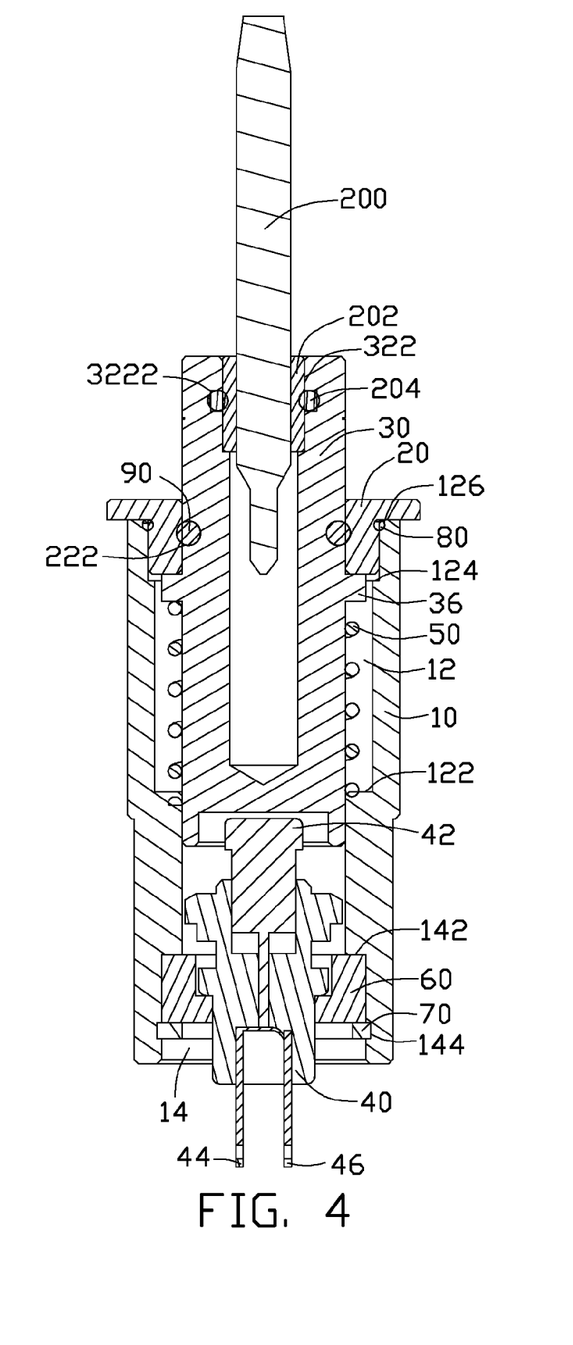
FIG. 4 is similar as FIG. 3, but assembled with a cutting tool.

Referring to FIGS. 1 and 2, an embodiment of a tool holder 100 includes a housing 10, a cover 20, a sleeve 30, a switch 40, and an elastic member 50. The cover 20 is fastened at an end of the housing 10. The sleeve 30 is received in one end of the housing 10 adjacent to the cover 20, the switch 40 is received in the other end of the housing 10 opposite to the sleeve 30, and the elastic member 50 is sleeved on the sleeve 30 and received in the housing 10. The tool holder 100 further includes a fastening member 60, a locking member 70, a first seal member 80, and a second seal member 90. In the illustrated embodiment, the tool holder 100 is used for holding a cutting tool 200 (as shown in FIG. 4).

Figure 3:
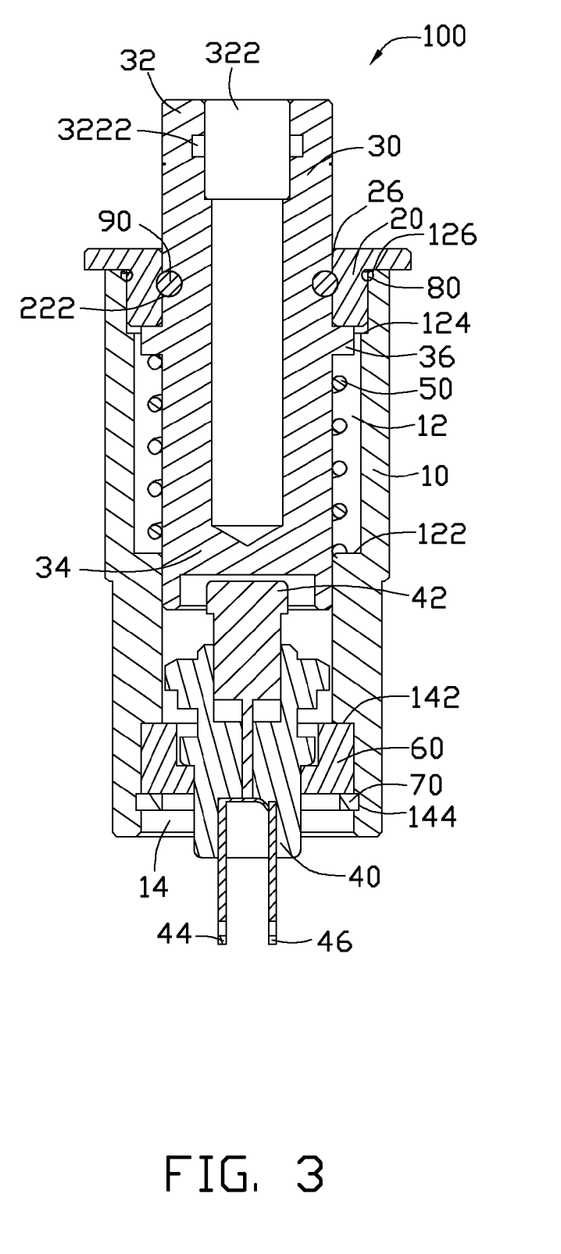
FIG. 3 is a cross-sectional view of the tool holder of FIG. 1 taken along the line III-III.

Referring also to FIG. 3, the housing 10 can be a hollow cylinder, and defines a stepped hole 12 at one end of the housing 10 and a shouldered hole 14 communicating with the stepped hole 12 at the other end of the housing 10. The housing 10 forms a first stepped portion 122 at one end of the inner surface of the housing 10 corresponding to the stepped hole 12 adjacent to the shouldered hole 14 and a second stepped portion 124 at the other end of the inner surface of the housing 10 corresponding to the stepped hole 12. The housing 10 further defines a receiving groove 126 at the inner surface of the housing 10 at the stepped hole 12 between an opening of the stepped hole 12 away from the shouldered hole 14 and the second stepped portion 124. The housing 10 further forms a restricting portion 142 at one end of the inner surface of the housing 10 corresponding to the shouldered hole 14 adjacent to the stepped hole 12 and defines a receiving portion 144 in the other end of the inner surface of the housing 10 corresponding to or at the shouldered hole 14.

The cover 20 includes a main portion 22 and a flange portion 24 perpendicularly extending from an end of the main portion 22. The cover 20 axially defines an assembling hole 26 in the main portion 22. In the illustrated embodiment, the main portion 22 is annular, and is configured to be received in the stepped hole 12 of the housing 10. The cover 20 further defines a receiving groove 222 in the inner surface of the main portion 22 corresponding to or at the assembling hole 26 for receiving the second seal member 90. The axial movement of the cover 20 can be restricted by the second stepped portion 124 of the housing 10.

The sleeve 30 can be a hollow cylinder, and includes an open end 32 and a closed end 34 at the opposite ends thereof. The sleeve 30 axially defines a receiving hole 322 for receiving the cutting tool 200 at the open end 32. The sleeve 30 further defines a plurality of receiving grooves 3222 spaced from each other and arranged in a circle in the inner surface of the open end 32 at the receiving hole 322. The sleeve 30 forms a shoulder 36 at the outer surface of the sleeve 30.

The switch 40 is received in the shouldered hole 14 of the housing 10. In the illustrated embodiment, the switch 40 is a contact switch. The switch 40 includes a contact portion 42 at one end of the switch 40 adjacent to the stepped hole 12 and a first electrical terminal 44 and a second electrical terminal 46 at the other end of the switch 40. In the illustrated embodiment, the first electrical terminal 44 and the second electrical terminal 46 are electrically connected to a control system of the main spindle of a computer numerical control (CNC) machine (not shown). The switch 40 is applied for controlling the movement of the main spindle.

The elastic member 50 is a spring, and is sleeved on the closed end 34 of the sleeve 30 and received in the housing 10. One end of the elastic member 50 resists with the shoulder 36, and the other end of the elastic member 50 resists with the first stepped portion 122.

The fastening member 60 can be a hollow cylinder, and is sleeved on the switch 40 and received in the shouldered hole 14. The outer diameter of the fastening member 60 is equal to the inner diameter of the shouldered hole 14 for fastening the switch 40 in the shouldered hole 14. The locking member 70 is semi-hermetically sealed, annular and elastic. The locking member 70 is received in the receiving portion 144. The locking member 70 can be firmly fastened in the receiving portion 144 and resist with an end of the fastening member 60 for preventing the fastening member 60 from being taken out of the shouldered hole 14.

The first seal member 80 is received in the receiving groove 126, and the second seal member 90 is received in the receiving groove 222. The first seal member 80 and the second seal member 90 can prevent the switch 40 from damage due to oil, water, dust or cutting fluid entering into the shouldered hole 14.

Referring to FIG. 4, the cutting tool 200 is received in the receiving hole 322 of the sleeve 30. A mounting sleeve 202 is non-movably sleeved on the cutting tool 200. The mounting sleeve 202 forms a plurality of elastic protrusions 204 at the outer surface of the mounting sleeve 202. The cutting tool 200 with the mounting sleeve 202 can be received in the housing 10 of the tool holder 100. The cutting tool 200 is received in the receiving hole 322 and the plurality of elastic protrusions 204 are received in the receiving grooves 3222 correspondingly.

During the assembly of the tool holder 100, the first seal member 80 is received in the receiving groove 126, and the second seal member 90 is received in the receiving groove 222. The elastic member 50 is sleeved on the sleeve 30. The sleeve 30 with the elastic member 50 is received in the housing 10 through the stepped hole 12. The cover 20 is non-movably fastened in the stepped hole 12 with an end of the main portion 22 away from the flange portion 24 resisting with the shoulder 36 to prevent the sleeve 30 from being taken out of the stepped hole 12. At this time, one end of the elastic member 50 elastically resists with the shoulder 36, and the other end of the elastic member 50 elastically resists with the first stepped portion 122. The switch 40 with the fastening member 60 is received in the shouldered hole 14, and the locking member 70 is received in the receiving portion 144 and resists with an end of the fastening member 60 for preventing the fastening member 60 from being taken out of the shouldered hole 14. One end of the fastening member 60 resists with the restricting portion 142, and the other end of the fastening member 60 resists with the locking member 70.

In use, the first electrical terminal 44 and the second electrical terminal 46 are electrically connected to a control system of the main spindle of a CNC turning machine or lathe. Typically, the switch 40 is in an off state. When the CNC turning machine changes a cutting tool under normal operation, the cutting tool 200 is received in the sleeve 30 in a controlling position, the sleeve 30 will not contact the contact portion 42, and the main spindle of the CNC turning machine will work normally.

If the movement of the main spindle generates a deviation such as, for example, when the cutting tool 200 cannot be inserted into the stepped hole 12, or the axially moving distance of the cutting tool 200 exceeds the maximum allowable distance, the main spindle will drive the cutting tool 200 to move towards the switch 40. In this process, the cutting tool 200 presses the sleeve 30, the elastic member 50 is compressed, and the sleeve 30 moves towards the switch 40 until the closed end 34 of the sleeve 30 contacts the contact portion 42 to stop the movement of the main spindle, which can prevent the main spindle, the cutting tool 200, or the tool holder 100 from being damaged.

Figure 5:
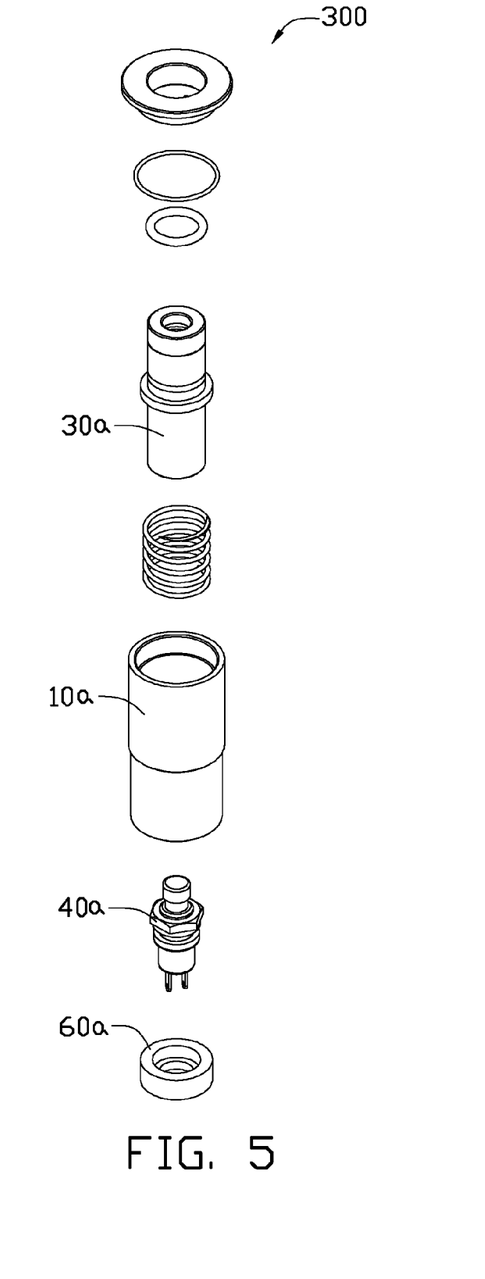
FIG. 5 is an exploded, isometric view of a second embodiment of a tool holder.
Figure 6:
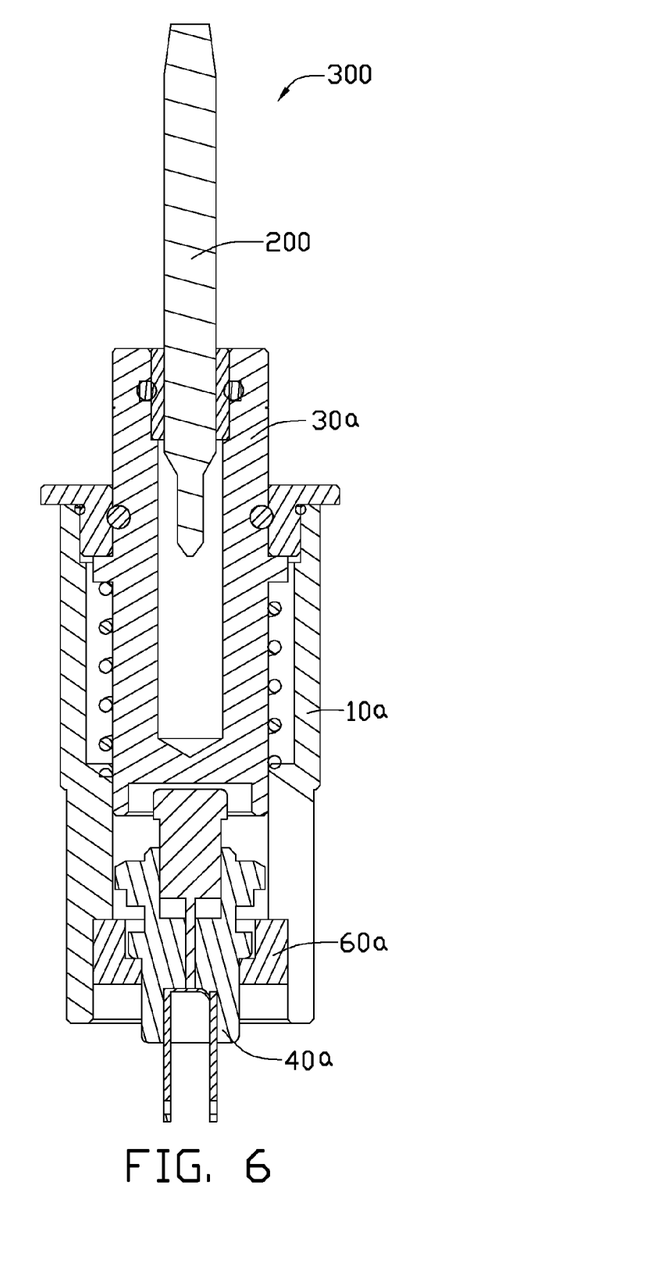
FIG. 6 is a cross-sectional view of the tool holder of FIG. 5 with a tool holder.

FIGS. 5 and 6 show a second embodiment of a tool holder 300. The tool holder 300 is similar to the tool holder 100, except that the locking member 70 and the receiving portion 144 of the tool holder 100 are omitted, and a fastening member 60a is adhered to the inner surface of a housing 10a by an adhesive. When a violent collision is acted on a sleeve 30a by the main spindle, the sleeve 30a and a switch 40a can be slided out of the housing 10a, which can prevent the sleeve 30a, the switch 40a, or the main spindle from being damaged.

In summary, the tool holder 100 includes the switch 40 electrically connected to the control system of the main spindle of the CNC turning machine. When a violent collision is acted on the sleeve 30 by the main spindle, the actuating of the switch 40 can stop the movement of the main spindle, which can prevent the sleeve 30, the switch 40, or the main spindle from being damaged.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A tool holder for holding a cutting tool, comprising:
a housing;
a sleeve movably assembled in one end of the housing for receiving the cutting tool;
a switch fastened in the other end of the housing for electrically connecting with a control system of a main spindle of a CNC turning machine to control a movement of the main spindle; and
an elastic member sleeved on the sleeve and received in the housing, wherein the elastic member is compressed to elastically resist with the sleeve and generates an elastic force to make the sleeve to move away from the switch, and the sleeve is slidably configured along an inner surface of the housing to compress the elastic member and contact the switch to stop the movement of the main spindle of the CNC;
wherein the switch comprises a contact portion at one end thereof adjacent to the sleeve and a first electrical terminal and a second electrical terminal at the other end thereof, and the first electrical terminal and the second electrical terminal are electrically connected to the control system of the main spindle.

2. The tool holder of claim 1, wherein the housing defines a stepped hole at one end of the housing and a shouldered hole communicating with the stepped hole at the other end of the housing, the housing forms a first stepped portion at one end of the inner surface of the housing corresponding to the stepped hole adjacent to the shouldered hole, the sleeve forms a shoulder at the outer surface thereof, and the elastic member elastically resists between the shoulder and the stepped portion.

3. The tool holder of claim 2, further comprising a cover fastened at an end of the housing adjacent to the sleeve to prevent the sleeve from being taken out of the housing, and the housing further forms a second stepped portion at the other end of the inner surface of the housing corresponding to the stepped hole for restricting an axial movement of the cover.

4. The tool holder of claim 3, further comprising a first seal member, the housing defines a receiving groove in the inner surface of the housing at the stepped hole for receiving the first seal member.

5. The tool holder of claim 3, further comprising a second seal member, the cover comprises a main portion and a flange portion perpendicularly extending from an end of the main portion, and the cover defines a receiving groove at the inner surface of the main portion for receiving the second seal member.

6. The tool holder of claim 2, further comprising a fastening member firmly sleeved on the switch, and the fastening member is adhered to the inner surface of the housing corresponding to the shouldered hole.

7. The tool holder of claim 2, further comprising a fastening member and a locking member, the fastening member is firmly sleeved on the switch, the housing further forms a restricting portion at one end of the inner surface of the housing corresponding to the shouldered hole adjacent to the stepped hole and defines a receiving portion in the other end of the inner surface of the housing corresponding to the shouldered hole for receiving the locking member, and one end of the fastening member resists with the restricting portion and the other end of the fastening member resists with the locking member.

8. A tool holder for holding a cutting tool, comprising:
a housing defining a stepped hole at one end of the housing and a shouldered hole communicating with the stepped hole at the other end of the housing;
a sleeve assembled in the stepped hole for receiving the cutting tool;
a switch fastened in the shouldered hole for electrically connecting with a control system of a main spindle of a CNC turning machine to control the movement of the main spindle; and
an elastic member sleeved on the sleeve, wherein the sleeve forms a shoulder at an end of the outer surface of the sleeve, the housing forms a first stepped portion at the inner surface of the housing corresponding to the stepped hole adjacent to the shouldered hole, the elastic member elastically resists between the shoulder and the first stepped portion, and the sleeve is slidably configured along the inner surface of the housing to contact the switch to stop the movement of the main spindle of the CNC turning machine;
wherein the switch comprises a contact portion at one end thereof adjacent to the sleeve and a first electrical terminal and a second electrical terminal at the other end thereof, and the first electrical terminal and the second electrical terminal are electrically connected to the control system of the main spindle.

9. The tool holder of claim 8, further comprising a first seal member, the housing defines a receiving groove in the inner surface of the housing at the stepped hole for receiving the first seal member.

10. The tool holder of claim 8, further comprising a cover sleeved on the sleeve and fastened in an end of the stepped hole for preventing the sleeve sliding out of the stepped hole.

11. The tool holder of claim 10, wherein the housing further forms a second stepped portion at the inner surface of the housing corresponding to the stepped hole away from the shouldered hole for restricting the axial movement of the cover.

12. The tool holder of claim 10, further comprising a second seal member, the cover comprises a main portion and a flange portion perpendicularly extending from an end of the main portion, and the cover defines a receiving groove at the inner surface of the main portion for receiving the second seal member.

13. The tool holder of claim 8, further comprises a fastening member firmly sleeved on the switch, and the fastening member is adhered to the inner surface of the housing corresponding to the shouldered hole.

14. The tool holder of claim 8, further comprising a fastening member and a locking member, the fastening member is firmly sleeved on the switch, the housing further forms a restricting portion at one end of the inner surface of the housing corresponding to the shouldered hole adjacent to the stepped hole and defines a receiving portion in the other end of the inner surface of the housing corresponding to the shouldered hole for receiving the locking member, and one end of the fastening member resists with the restricting portion and the other end of the fastening member resists with the locking member.

15. A tool holder for holding a cutting tool, comprising:
a housing;
a sleeve movably assembled in one end of the housing for receiving the cutting tool;
a switch fastened in the other end of the housing for electrically connecting with a control system of a main spindle of a CNC turning machine to control the movement of the main spindle;
a fastening member firmly sleeved on the switch and adhered to an inner surface of the housing; and
an elastic member sleeved on the sleeve and received in the housing, wherein the elastic member is compressed to elastically resist with the sleeve and generates an elastic force to make the sleeve to move away from the switch, and the sleeve is slidably configured along the inner surface of the housing to compress the elastic member and contact the switch to stop the movement of the main spindle of the CNC.

16. The tool holder of claim 15, wherein the housing defines a stepped hole at one end of the housing and a shouldered hole communicating with the stepped hole at the other end of the housing, the housing forms a first stepped portion at one end of the inner surface of the housing corresponding to the stepped hole adjacent to the shouldered hole, the sleeve forms a shoulder at the outer surface thereof, and the elastic member elastically resists between the shoulder and the stepped portion, and the fastening member is received in the shouldered hole.

17. The tool holder of claim 16, further comprising a cover fastened at an end of the housing adjacent to the sleeve to prevent the sleeve from being taken out of the housing, and the housing further forms a second stepped portion at the other end of the inner surface of the housing corresponding to the stepped hole for restricting a axial movement of the cover.

18. The tool holder of claim 17, further comprising a first seal member, the housing defines a receiving groove in the inner surface of the housing at the stepped hole for receiving the first seal member.

19. The tool holder of claim 16, further comprising a second seal member the cover comprises a main portion and a flange portion perpendicularly extending from an end of the main portion, and the cover defines a receiving groove at the inner surface of the main portion for receiving the second seal member.

* * * * *